Figure 1:
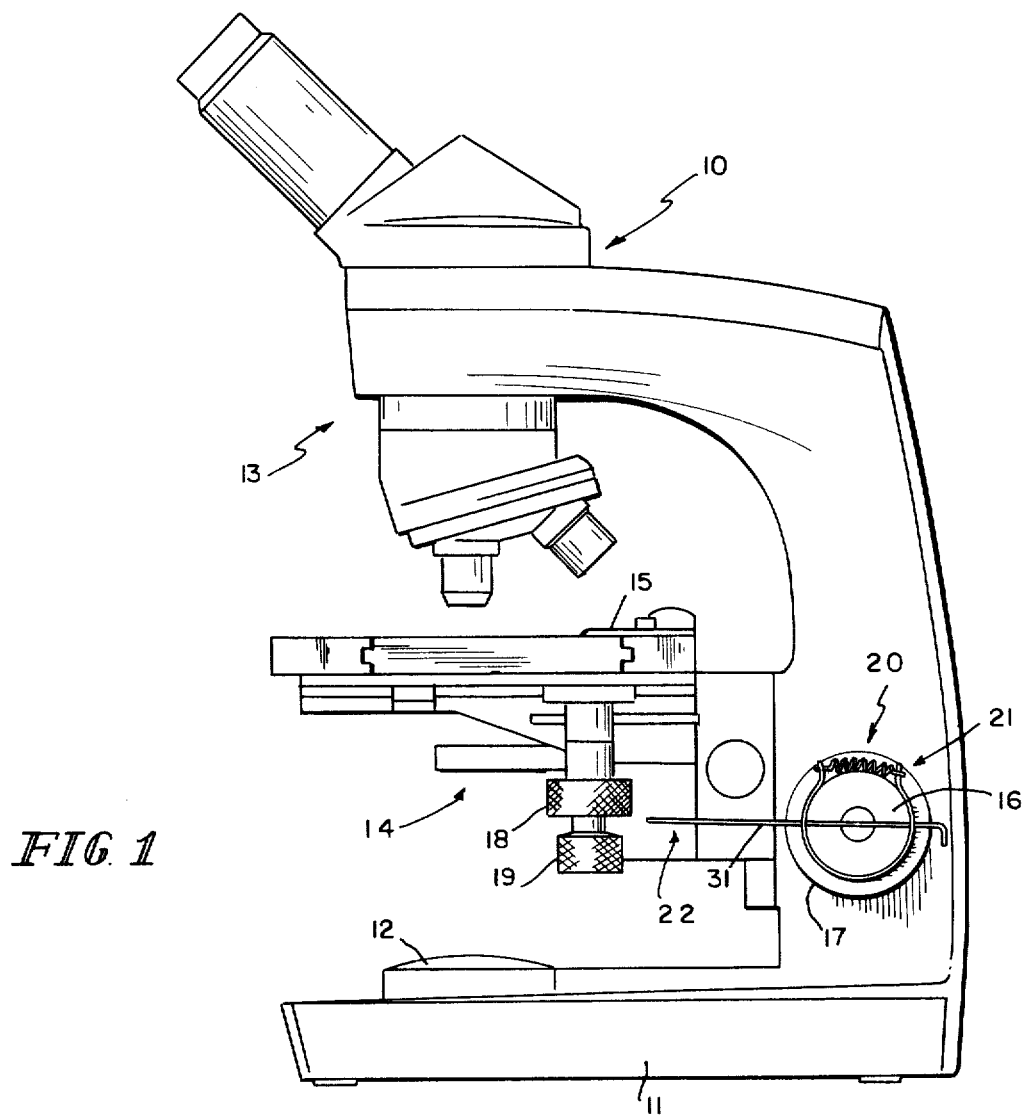

United States Patent [19]

Bell

[11] 4,240,708
[45] Dec. 23, 1980

[54] MICROSCOPE REMOTE CONTROL FOCUS ATTACHMENT

[76] Inventor: William A. Bell, R.R.2, Heim Rd., Chandler, Ind. 47610

[21] Appl. No.: 10,813

[22] Filed: Feb. 9, 1979

[51] Int. Cl.³ .............................................. G02B 7/04
[52] U.S. Cl. .................................... 350/321; 350/46; 16/113; 16/DIG. 25
[58] Field of Search ...................... 350/46, 47, 86–91, 350/81, 82, 84, 321; 74/544; 16/113, DIG. 25, DIG. 30

[56] References Cited

U.S. PATENT DOCUMENTS 3,350,977  11/1967  Gans et al. .............................. 350/46

Primary Examiner—Jon W. Henry
Attorney, Agent, or Firm—Jenkins, Coffey, Hyland, Badger & Conard

[57] ABSTRACT

An attachment for permitting the focus of a microscope while operating the microscope stage may be provided with means including a fastener engagable with the focusing control of the microscope and providing an extended surface to permit simultaneous and one-handed operation of the microscope focusing control and the microscope stage by an operator.

4 Claims, 2 Drawing Figures

U.S. Patent

Dec. 23, 1980

4,240,708

MICROSCOPE REMOTE CONTROL FOCUS ATTACHMENT

This invention relates to an attachment for a microscope permitting the focusing of a microscope while simultaneously operating a microscope stage.

Microscopes, as for example shown in U.S. Pat. No. 3,260,157, include controls to permit focusing of its optical system upon a specimen carried on a microscope attached to the microscope between its condensing light system and optical viewing system. The microscope stage permits the specimen to be moved in generally orthogonal directions with respect to the microscope's optical viewing system; permitting various portions of the specimen to be viewed through the microscope. Microscope stages that are available frequently include means to clamp the specimen slide between a pair of projecting, frequently spring-loaded, fingers to hold the slide and specimen on the microscope stage. The specimen is relocated with respect to the optical viewing system of the microscope by sliding the microscope slide over the surface that provides a reference plane from which the focus of the microscope is determined. Such microscope stages, however, do not provide means to reliably reposition the specimen under the microscope without departure from the plane upon which the microscope is focused. Because of this, the operators of the microscopes must frequently refocus the microscope while relocating the viewing area of the microscope on the specimen. In addition, the operator of the microscope must frequently use one hand to operate counting or calculating machines or to make notes. The use of one hand to operate the microscope stage and reposition the slide while using the other hand to refocus the microscope is not only bothersome but significantly slows the operations being performed with the microscope.

In accordance with my invention I provide an attachment for the focusing control of a microscope to permit its operation by an operator, using the same hand that is used to operate the microscope stage. Such an attachment includes a fastener engagable with the focusing control of the microscope and carrying an extended surface to permit operation of the microscope focusing control from the remotely-located control of the microscope stage. Such an attachment can include a strap-like fastener being shaped to engage the circumference of the fine focusing knob of a microscope. An engaging force between the strap and the knob can be provided by a tensioning spring supported between tabs at each end of the strap-like fastener. The strap-like fastener further can include circumferentially located tabs having openings to frictionally and adjustably engage a wire-like member to provide an extended surface permitting the adjustment of the microscope fine focusing control from the location of the controls of the microscope stage.

Other features and advantages of the invention will be apparent from the drawings and descriptions which follow.

Figure 2:
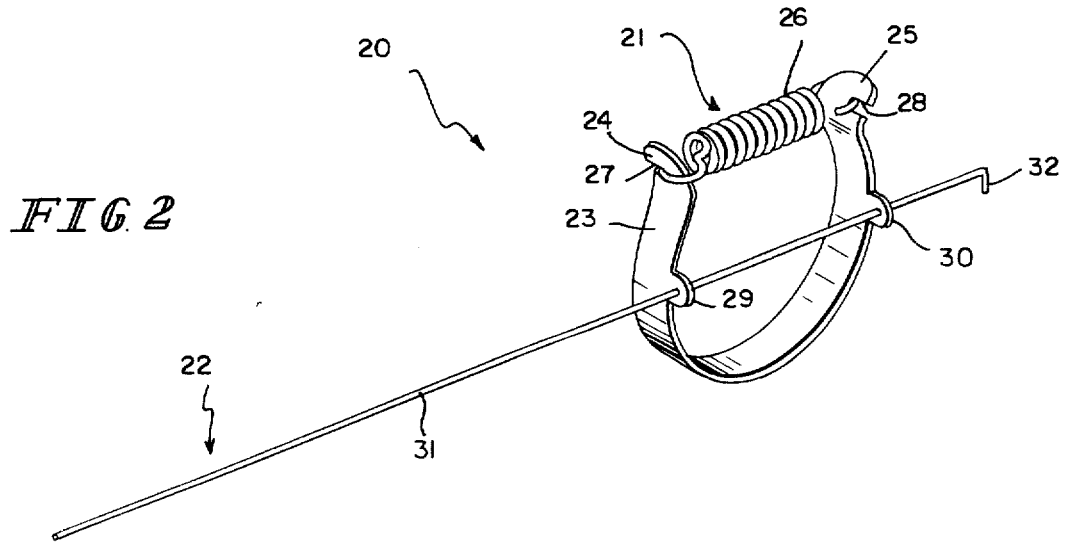

FIG. 1 is a drawing of a microscope illustrating the use of the attachment of this invention; and FIG. 2 is a drawing of a specific embodiment of the invention.

The microscope 10 shown in FIG. 1 has a construction like that set forth in U.S. Pat. No. 3,260,157, which is incorporated herein by reference. Such a microscope includes a base 11 and illuminating means 12 and optical system, generally indicated as 13. A microscope stage 14 is mounted to the base 11 between the illuminating system 12 and the optical system 13 of the microscope. The optical system of the microscope 10 is focused upon specimens carried by specimen slide-engaging means 15 of the microscope stage 14, by a pair of knobs 16 and 17 to permit focus adjustment of the microscope.

Specimens carried by the slide engaging means 15 of the microscope stage 14 may be located in generally orthogonal directions by adjustment of the coaxial knobs 18 and 19 of microscope stage 14.

In accordance with my invention the microscope 10 is provided with an attachment 20 for focusing the microscope optical system from the remote location of the knobs permitting adjustment of the microscope stage. Such an attachment includes means including a fastener 21 engagable with the focusing control, and preferably the fine focusing control, of the microscope and providing an extended surface 22 at the remote location of the controls of the microscope stage. The fastener 21 can be formed from a thin strap 23 shaped to engage and drive the circumference of the fine focusing knob 16 of the microscope. The strap 23 can have tabs 24 and 25 at its ends, bent to extend radially from the circumference of the fine focusing knob. A tensioning spring 26 can be located between the tabs 24 and 25, preferably engaging slots 27 and 28, or other portions of the tab adapted to permit engagement of the ends of such a tensioning spring 26. The tensioning spring 26 can supplement the force of engagement of strap 23 or can supply such force, as appropriate. Further tabs 29 and 30 extend from the strap 23, generally in a direction parallel to the axis of the rotation of the fine focusing control. Tabs 29 and 30 can be provided with openings to engage a wire-like rod 31 extending between the openings of tabs 29 and 30. The wire-like rod 31 can extend radially from the strap and focusing control to provide the extended surface 22. Wire-like rod 31 can be frictionally engaged by the openings in the tabs 29 and 30 to permit adjustment of the rod 31 with respect to the fastener 21 to permit the user to conveniently locate the extended surface 22. Rod 31 includes a bent portion 32 to prevent the rod from being inadvertently disengaged from fastener 21.

As shown in FIG. 1, with such an attachment the fastener 21 may be placed upon the fine focusing control 16 of the microscope 11. The rod 31 of the attachment may be adjusted with respect to the fastener 21 so that the extended surface 22 is conveniently located adjacent the knobs 18 and 19 by which the microscope stage 14 is operated. The microscope user may thus simultaneously operate knobs 18 and 19 to locate the specimen with respect to the microscope optical system 13 and simultaneously operate the fine focusing control 16 of the microscope. This leaves the microscope operator with one hand free to be used in operating counting and calculating machines or for making notes.

While I have shown and described a specific preferred embodiment, my invention is defined by the scope of the claims which follow.

I claim:

1. An attachment for focusing a microscope while operating a microscope stage, comprising a thin strap shaped to engage and drive the circumference at a microscope focusing control, said strap carrying a wire-like rod extending radially from the strap to provide an extended surface adjacent the controls for operation of the microscope stage.

2. The attachment of claim 1 wherein said strap has tabs at its end bent to extend radially from the microscope focusing control and further circumferentially located tabs extending from the strap generally parallel to the axis of rotation of the said control and frictionally and adjustably engaging the wire-like rod by openings through which the rod extends, said strap being urged into engagement with said control by a tension spring between the tabs at its ends.

3. An attachment for focusing a microscope while operating a microscope stage, comprising a fastener being shaped to engage the circumference of a microscope knob and providing a tensioning spring to provide engaging force between the fastener and the knob, said fastener further including circumferentially located means to provide an extended member projecting outwardly and generally radially from the fastener as an extended surface, for manipulation of the microscope focus with the fingers of the hand used to operate the microscope stage.

4. The attachment of claim 3 wherein said fastener is a strap shaped to engage the circumference of a knob and having tabs at each end and a tensioning spring between the tabs to provide engaging force between the strap and the knob, said strap further including circumferentially located tabs having openings to frictionally and adjustably engage a wire-like member as the extended surface, permitting adjustment of the microscope focus with the fingers of the hand used to operate the microscope stage.

* * * * *